US009488888B2

(12) United States Patent
Lee et al.

(10) Patent No.: US 9,488,888 B2
(45) Date of Patent: Nov. 8, 2016

(54) DISPLAY DEVICE

(71) Applicant: Samsung Display Co., Ltd., Yongin, Gyeonggi-do (KR)

(72) Inventors: Sun Hwa Lee, Yongin (KR); Kwang-Chul Jung, Yongin (KR); Se Young Song, Yongin (KR); Mee Hye Jung, Yongin (KR); In-Jae Hwang, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 171 days.

(21) Appl. No.: 14/273,034

(22) Filed: May 8, 2014

(65) Prior Publication Data

US 2015/0138479 A1 May 21, 2015

(30) Foreign Application Priority Data

Nov. 18, 2013 (KR) ........................ 10-2013-0139976

(51) Int. Cl.
*G02F 1/1333* (2006.01)
*G02F 1/1362* (2006.01)
*G02F 1/1341* (2006.01)

(52) U.S. Cl.
CPC ....... *G02F 1/136209* (2013.01); *G02F 1/1341* (2013.01); *G02F 1/133377* (2013.01); *G02F 1/136286* (2013.01)

(58) Field of Classification Search
CPC ............................... G02F 1/133377
See application file for complete search history.

(56) References Cited

U.S. PATENT DOCUMENTS

| 5,583,675 | A | * | 12/1996 | Yamada | ............ G02F 1/133377 349/106 |
| 6,970,221 | B1 | | 11/2005 | Park et al. | |
| 7,196,745 | B2 | | 3/2007 | Enda et al. | |
| 8,159,429 | B2 | | 4/2012 | Kim et al. | |
| 8,467,026 | B2 | | 6/2013 | Inoue et al. | |
| 9,354,477 | B2 | * | 5/2016 | Yang | ................. G02F 1/136209 |
| 2010/0182521 | A1 | * | 7/2010 | Inoue | ................. G02F 1/134336 349/33 |
| 2011/0007249 | A1 | * | 1/2011 | Huang | .............. G02F 1/133514 349/106 |
| 2012/0062448 | A1 | | 3/2012 | Kim et al. | |

(Continued)

FOREIGN PATENT DOCUMENTS

| KR | 10-2007-0087293 | 8/2007 |
| KR | 10-2009-0072391 | 7/2009 |

(Continued)

*Primary Examiner* — Jessica M Merlin
*Assistant Examiner* — Mark Teets
(74) *Attorney, Agent, or Firm* — Knobbe Martens Olson & Bear LLP

(57) ABSTRACT

A display device improves horizontal crosstalk and an aperture ratio, and includes: a substrate; a gate line and a data line formed on the substrate; a thin film transistor connected to the gate line and the data line; a pixel electrode connected to the thin film transistor; a light block overlapping the thin film transistor on the pixel electrode; a light block passivation layer overlapping the thin film transistor and the data line on the light block; a common electrode formed on the pixel electrode, spaced apart from the pixel electrode with a plurality of microcavities interposed therebetween; a roof layer formed on the common electrode; an injection hole exposing a part of each of the plurality of microcavities; a liquid crystal layer filling the plurality of microcavities; and an encapsulation layer formed on the roof layer covering the injection hole to seal the microcavity.

17 Claims, 7 Drawing Sheets

(56) References Cited

U.S. PATENT DOCUMENTS

2013/0093985 A1 4/2013 Kang et al.
2013/0182203 A1 7/2013 Lee et al.

FOREIGN PATENT DOCUMENTS

KR 10-2013-0063140 6/2013
KR 10-2015-0007175 1/2015

* cited by examiner

DISPLAY DEVICE

CROSS-REFERENCE TO RELATED APPLICATIONS

This application claims priority to, and the benefit of, Korean Patent Application No. 10-2013-0139976 filed in the Korean Intellectual Property Office on Nov. 18, 2013, the entire contents of which are incorporated herein by reference.

BACKGROUND

1. Field

The present disclosure relates to a display device capable of improving horizontal crosstalk and an aperture ratio.

2. Description of the Related Technology

A liquid crystal display is a widely used flat panel display, includes two display panels on which field generating electrodes, such as a pixel electrode and a common electrode, are formed and a liquid crystal layer interposed therebetween, and displays an image by applying a voltage to the field generating electrodes to generate an electric field on the liquid crystal layer, determining alignment of liquid crystal molecules of the liquid crystal layer through the generated electric field, and controlling polarization of incident light.

The two display panels may include a thin film transistor array panel and an opposing display panel. In the thin film transistor array panel, a gate line transferring a gate signal and a data line transferring a data signal are formed to cross each other, and a thin film transistor connected to the gate line and the data line, a pixel electrode connected to the thin film transistor, and the like may be formed. A light block, a color filter, a common electrode, and the like may be formed in the opposing display panel. If necessary, the light block, the color filter, and the common electrode may be formed in the thin film transistor array panel. The light block is configured to block light from passing through it.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present disclosure has been made in an effort to provide a display device of which weight, a thickness, a cost, and a process time may be decreased by manufacturing the display device by using one substrate.

Further, the present disclosure has been made in an effort to provide a display device capable of improving horizontal crosstalk and an aperture ratio.

Further, the present disclosure has been made in an effort to provide a display device capable of preventing a short circuit between a pixel electrode and a common electrode.

One embodiment provides a display device, including: a substrate; a gate line and a data line formed on the substrate; a thin film transistor connected to the gate line and the data line; a pixel electrode connected to the thin film transistor; a light block overlapping the thin film transistor on the pixel electrode; a light block passivation layer overlapping the thin film transistor and the data line on the light block; a common electrode formed on the pixel electrode, spaced apart from the pixel electrode with a plurality of microcavities interposed therebetween; a roof layer formed on the common electrode; an injection hole exposing a part of each of the plurality of microcavities; a liquid crystal layer filling the plurality of microcavities; and an encapsulation layer formed on the roof layer covering the injection hole to seal the microcavity.

The pixel electrode may overlap the data line.

The data line may include a first data line and a second data line, the pixel electrode may include a first sub pixel electrode and a second sub pixel electrode, and the first sub pixel electrode and the second sub pixel electrode may overlap the first data line and the second data line.

Different data voltages may be applied to the first data line and the second data line.

A data voltage applied to the first data line may be higher than a data voltage applied to the second data line.

The data line may be positioned between two adjacent microcavities.

The data line may be positioned between two adjacent microcavities in a row direction.

The gate line may be positioned between two adjacent microcavities in a column direction.

The light block and the light block passivation layer may further overlap the gate line.

The gate line and the data line may cross each other.

The display device ac may further include a storage electrode line formed in parallel with the gate line, and overlapping one side edge of the pixel electrode.

The storage electrode line may not be formed in parallel to the data line.

The display device may further include a spacer overlapping the data line.

The spacer may be formed on the pixel electrode, and is formed under the light block passivation layer.

The spacer may be formed on the same layer as that of the light block.

The spacer may include the same material as that of the light block.

The light block passivation layer may be formed on the pixel electrode, and may be formed under the common electrode.

The light block passivation layer may include an inorganic insulating material including silicon nitride and silicon oxide.

According to embodiments of the present invention, the display device is manufactured by using one substrate, thereby decreasing weight, a thickness, a cost, and a process time of the display device.

Further, the data line overlap the pixel electrode, so that it is possible to improve horizontal crosstalk and an aperture ratio.

Further, the spacer and/or the light block passivation layer are formed so as to overlap the data line, so that it is possible to prevent a short circuit between the pixel electrode and the common electrode.

DETAILED DESCRIPTION OF CERTAIN INVENTIVE EMBODIMENTS

Figure 1:
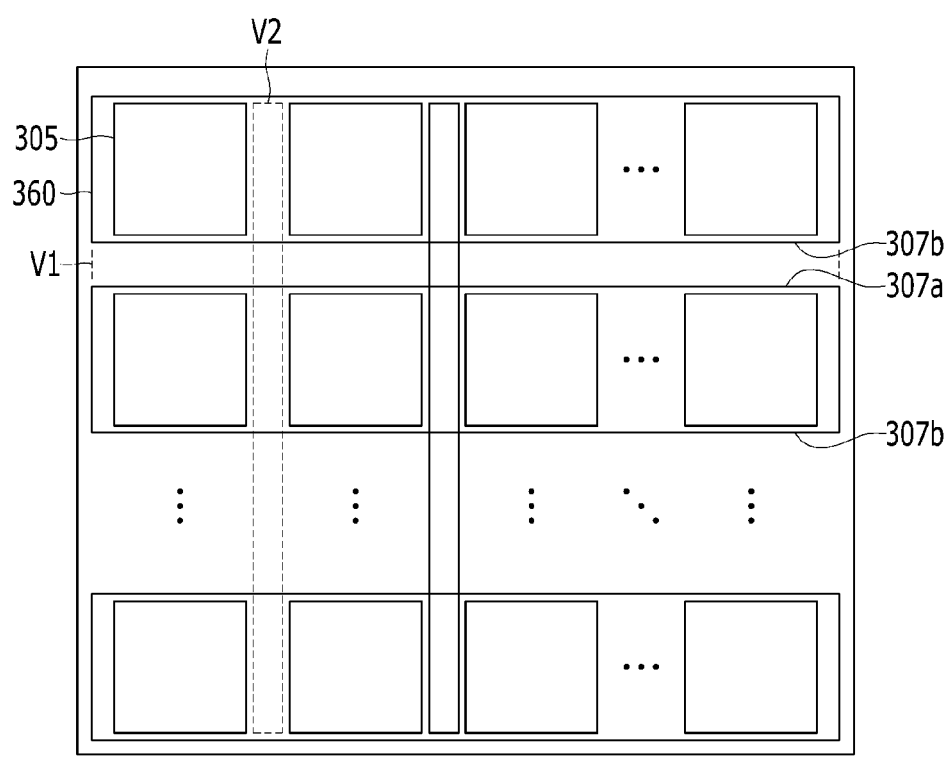
FIG. 1 is a top plan view illustrating a display device according to an embodiment.

Hereinafter, the present disclosure will be described more fully hereinafter with reference to the accompanying drawings, in which certain embodiments of the invention are shown. As those skilled in the art would realize, the described embodiments may be modified in various ways, without departing from the spirit or scope of the present invention.

In the drawings, the thickness of layers, films, panels, regions, etc., may be exaggerated for clarity. Like reference numerals generally designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In a conventional liquid crystal display, two substrates are essentially used and constituent elements are formed on the two substrates, so that there are problems in that the display device is heavy and thick, a cost thereof is high, and a process time is long.

First, a display device according to an embodiment will be schematically described below with reference to FIG. 1.

FIG. 1 is a top plan view illustrating the display device according to an embodiment.

The display device includes a substrate 110 including a material, such as glass or plastic.

Microcavities 305 covered by a roof layer 360 are formed on the substrate 110. The roof layer 360 is extended in a row direction, and the plurality of microcavities 305 is formed under one roof layer 360.

The microcavities 305 may be arranged in a matrix form, and a first valley V1 is positioned between the vertically adjacent microcavities 305, and a second valley V2 is positioned between the horizontally adjacent microcavities 305.

The plurality of roof layers 360 may be separated from each other with the first valley V1 interposed therebetween. The microcavities 305 may not be covered by the roof layer 360 but may be exposed to the outside at portions which are in contact with the first valley V1. They are referred to as injection holes 307a and 307b.

The injection holes 307a and 307b are formed at both edges of the microcavity 305. The injection holes 307a and 307b include a first injection hole 307a and a second injection hole 307b, and the first injection hole 307a is formed so as to expose a lateral surface of a first edge of the microcavity 305, and the second injection hole 307b is formed so as to expose a lateral surface of a second edge of the microcavity 305. The lateral surface of the first edge and the lateral surface of the second edge of the microcavity 305 face each other.

Each roof layer 360 is formed to be spaced apart from the substrate 110 between the adjacent second valleys V2 to form the microcavity 305. The roof layer 360 is formed so as to cover the remaining lateral surfaces, except for the lateral surfaces of the first edge and the second edge in which the injection holes 307a and 307b are formed.

The aforementioned structure of the display device is just an example, and various modifications are feasible. For example, a disposition form of the microcavity 305, the first valley V1, and the second valley V2 may be changed, the plurality of roof layers 360 may be connected to each other in the first valley V1, and a portion of each roof layer 360 may be formed to be spaced apart from the substrate 110 in the second valley V2 to connect the adjacent microcavities 305 to each other.

Hereinafter, one pixel of the display device will be schematically described with reference to FIG. 2.

Figure 2:
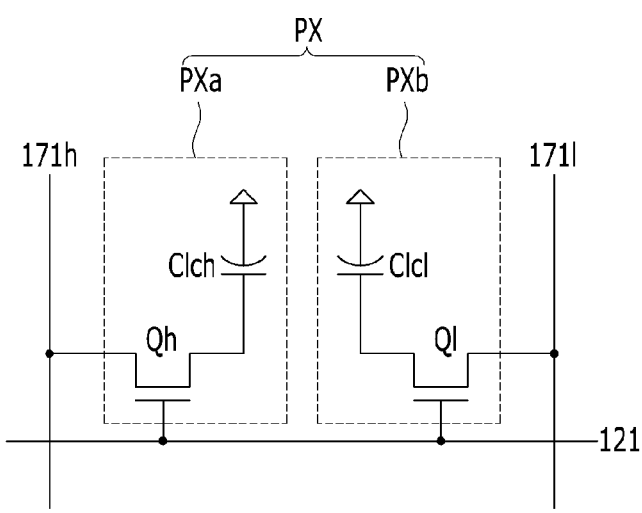
FIG. 2 is an equivalent circuit diagram of one pixel of the display device according to an embodiment.

FIG. 2 is an equivalent circuit diagram of one pixel of the display device according to an embodiment.

The display device includes a plurality of signal lines 121, 171h, and 171l, and a plurality of pixels PX connected to the plurality of signal lines 121, 171h, and 171l. The plurality of pixels PX may be arranged in a matrix form including a plurality of pixel rows and a plurality of pixel columns.

Each pixel PX may include a first sub pixel PXa and a second sub pixel PXb. The first sub pixel PXa and the second sub pixel PXb may be vertically disposed. In this case, the first valley V1 may be positioned in a direction of a pixel row between the first sub pixel PXa and the second sub pixel PXb, and the second valley V2 may be positioned between the plurality of pixel columns.

The signal lines 121, 171h, and 171l include a gate line 121 for transmitting a gate signal, and a first data line 171h and a second data line 171l for transmitting different data voltages.

The display device includes a first switch Qh connected to the gate line 121 and the first data line 171h, and a second switch Ql connected to the gate line 121 and the second data line 171l.

A first liquid crystal capacitor Clch connected with the first switch Qh is formed in the first sub pixel PXa, and a second liquid crystal capacitor Clcl connected with the second switch Ql is formed in the second sub pixel PXb.

A first terminal of the first switch Qh is connected with the gate line 121, a second terminal thereof is connected with the first data line 171h, and a third terminal thereof is connected to the first liquid crystal capacitor Clch.

A first terminal of the second switch Ql is connected with the gate line 121, a second terminal thereof is connected with the second data line 171l, and a third terminal thereof is connected to the second liquid crystal capacitor Clcl.

An operation of the liquid crystal display will be described. When a gate-on voltage is applied to the gate line 121, the first switch Qh and the second switch Ql connected to the gate line 121 become a turn-on state, and the first and second liquid crystal capacitors Clch and Clcl are charged by different data voltages transmitted through the first and second data lines 171h and 171l. The data voltage transmitted by the second data line 171l is lower than the data voltage transmitted by the first data line 171h. Accordingly, the second liquid crystal capacitor Clcl is charged with a voltage lower than that of the first liquid crystal capacitor Clch, thereby improving side visibility.

Hereinafter, a structure of one pixel of the liquid crystal display will be described with reference to FIGS. 3 to 5.

Figure 3:
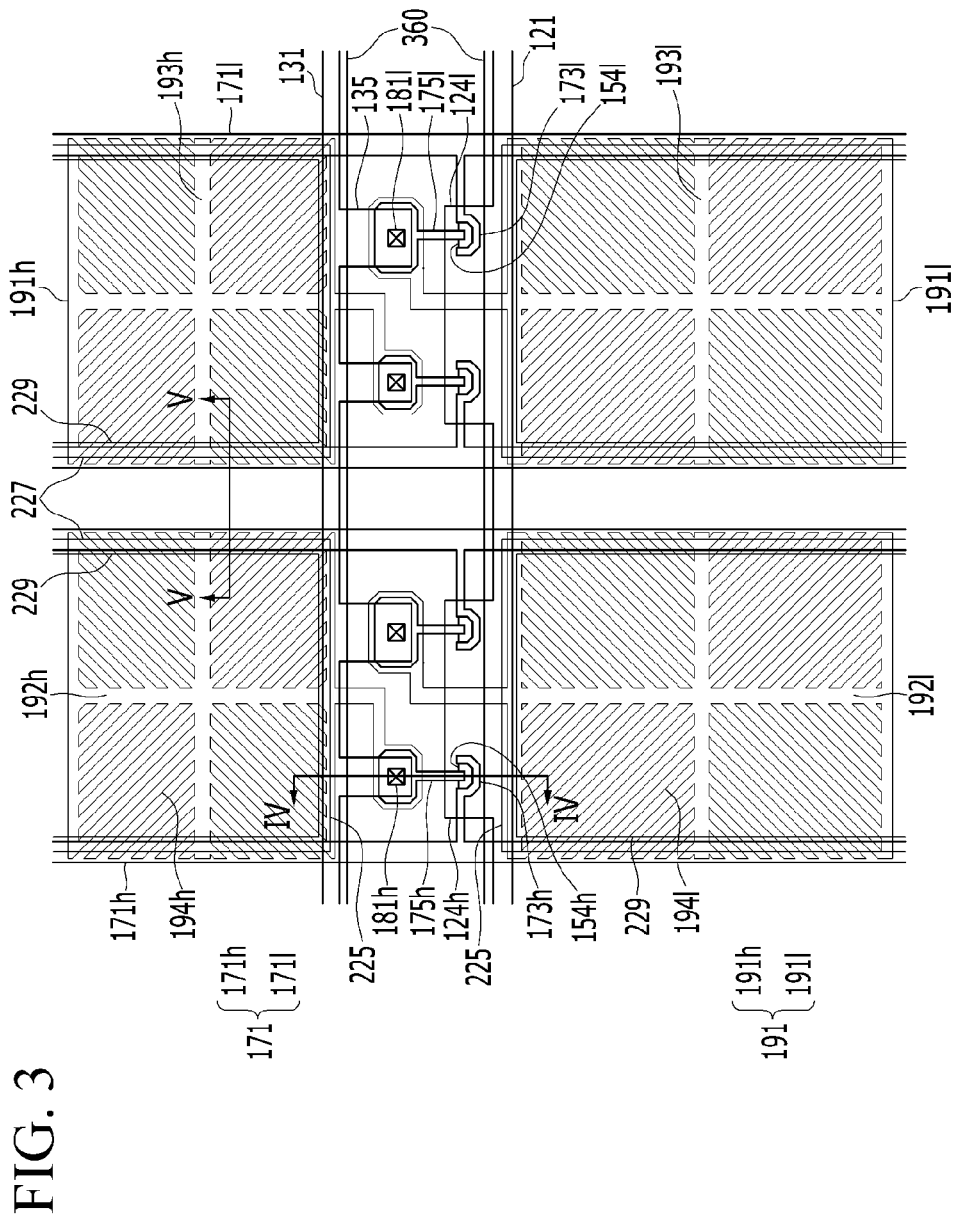
FIG. 3 is a layout view illustrating a part of the display device according to an embodiment.
Figure 4:
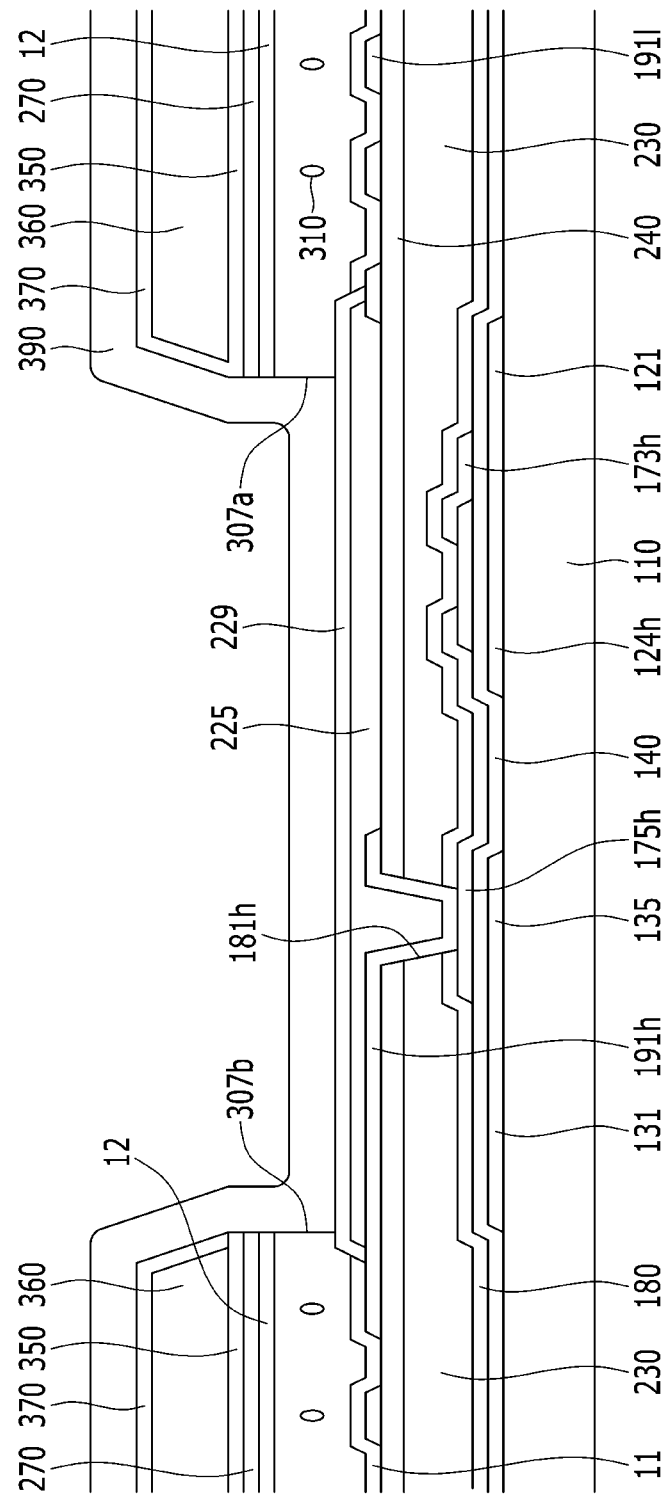
FIG. 4 is a cross-sectional view of the display device according to an embodiment taken along line IV-IV.
Figure 5:
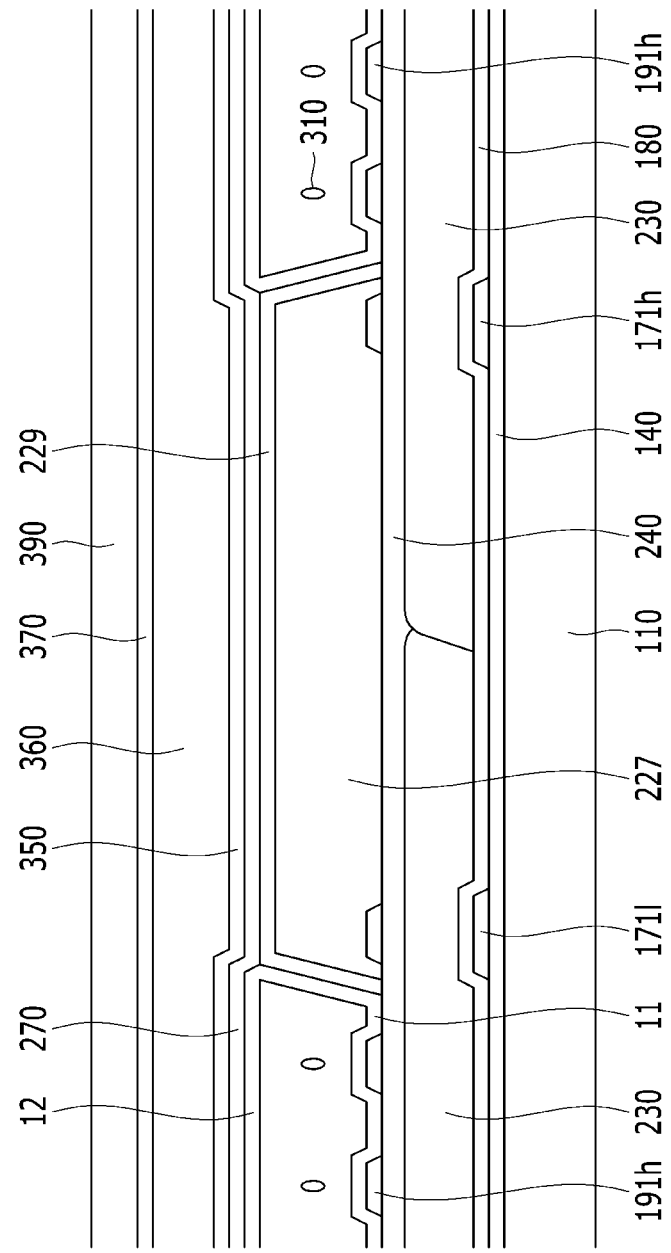
FIG. 5 is a cross-sectional view illustrating the display device according an embodiment taken long line V-V.

FIG. 3 is a layout view illustrating a part of the display device according to an embodiment, FIG. 4 is a cross-sectional view of the display device according to an embodiment taken along line IV-IV, and FIG. 5 is a cross-sectional view illustrating the display device according to an embodiment taken long line V-V.

Referring to FIGS. 3 to 5, the gate line 121 and a first gate electrode 124h and a second gate electrode 124l protruding from the gate line 121 are formed on the substrate 110.

The gate line 121 mainly extends in a horizontal direction, and transmits a gate signal. The gate line 121 is positioned between the two microcavities 305 which are adjacent in a column direction. The first gate electrode 124h and the second gate electrode 124l upwardly protrude from the gate line 121. The first gate electrode 124h and the second gate electrode 124l are connected to each other to form one protrusion. However, embodiments are not limited thereto, and the protruding form of the first gate electrode 124h and the second gate electrode 124l may be variously modified.

A storage electrode line 131 and a storage electrode 135 protruding from the storage electrode line 131 may be further formed on the substrate 110.

The storage electrode line 131 extends in a direction parallel to the gate line 121, and is formed to be spaced apart from the gate line 121. A predetermined voltage may be applied to the storage electrode line 131. The storage electrode 135 downwardly protrudes from the storage electrode line 131, and is formed so as to be adjacent to the first gate electrode 124h and the second gate electrode 124l.

The storage electrode line 131 is not formed in the direction parallel to the data line 171. The storage electrode line 131 and the storage electrode 135 are not formed at edges of the pixels PX adjacent to both sides of the data line 171, thereby improving an aperture ratio.

In the general display device, the storage electrode line 131 is formed at the edges of the pixels PX adjacent to the both sides of the data line 171, and an area, in which the data line 171 overlaps the storage electrode line 131, may be different due to misalignment of a mask. Accordingly, a deviation of capacitance between the data line 171 and the storage electrode line 131 may be generated. In an embodiment of the present invention, the storage electrode line 131 and the storage electrode 135 are not formed at the edges of the pixels PX adjacent to the both sides of the data line 171, so that it is possible to prevent the deviation from being generated.

A gate insulating layer 140 is formed on the gate line 121, the first gate electrode 124h, the second gate electrode 124l, the storage electrode line 131, and the storage electrode 135. The gate insulating layer 140 may include an inorganic insulating material, such as, for example, silicon nitride (SiNx) or silicon oxide (SiOx). Further, the gate insulating layer 140 may include a single layer or a multilayer.

A first semiconductor 154h and a second semiconductor 154l are formed on the gate insulating layer 140. The first semiconductor 154h may be positioned on the first gate electrode 124h, and the second semiconductor 154l may be positioned on the second gate electrode 124l. The first semiconductor 154h may be elongated to a lower portion of the first data line 171h, and the second semiconductor 154l may be elongated to a lower portion of the second data line 171l. The first semiconductor 154h and the second semiconductor 154l may include, for example, amorphous silicon, polycrystalline silicon, metal oxide, or the like.

An ohmic contact member (not illustrated) may be formed on each of the first semiconductor 154h and the second semiconductor 154l. The ohmic contact members may be made of, for example, silicide or a material such as n+ hydrogenated amorphous silicon on which an n-type impurity is doped at a high concentration.

The first data line 171h, the second data line 171l, a first source electrode 173h, a first drain electrode 175h, a second source electrode 173l, and a second drain electrode 175l are formed on the first semiconductor 154h, the second semiconductor 154l, and the gate insulating layer 140.

The first data line 171h and the second data line 171l transfer a data signal, and mainly extend in a vertical direction to cross the gate line 121 and the storage electrode 131. The data line 171 is positioned between the two microcavities 305 which are adjacent in the row direction.

The first data line 171h and the second data line 171l transmit different data voltages. The data voltage transmitted by the second data line 171I is lower than the data voltage transmitted by the first data line 171h.

The first source electrode 173h is formed so as to upwardly protrude from the first gate electrode 124h from the first data line 171h, and the second source electrode 173l is formed to upwardly protrude from the second gate electrode 124l from the second data line 171l. Each of the first drain electrode 175h and the second drain electrode 175l has one wide end portion and a rod-shaped end portion. The wide end portions of the first drain electrode 175h and the second drain electrode 175l overlap the storage electrode 135 downwardly protruding from the storage electrode line 131. Each of the rod-shaped end portions of the first drain electrode 175h and the second drain electrode 175l is partially surrounded by the first source electrode 173h and the second source electrode 173l.

The first and second gate electrodes 124h and 124I, the first and second source electrodes 173h and 173l, and the first and second drain electrodes 175h and 175l form first and second thin film transistors (TFT) Qh and Ql together with the first and second semiconductors 154h and 154l, and channels of the thin film transistors are formed in the semiconductors 154h and 154l between the source electrodes 173h and 173l and the drain electrodes 175h and 175l, respectively.

A passivation layer 180 is formed on the first semiconductor 154h and the second semiconductor 154l. The first semiconductor 154h is exposed between the first data line 171h, the second data line 171l, the first source electrode 173h and the first drain electrode 175h. The second semiconductor 154l is exposed between the first data line 171h, the second data line 171l, the second source electrode 173l, and the second drain electrode 175l. The passivation layer 180 may include an organic insulating material or an inorganic insulating material, and may include a single layer or a multilayer.

A color filter 230 is formed in each pixel PX on the passivation layer 180. Each color filter 230 may display any one of primary colors, such as, for example, three primary colors of red, green, and blue. The color filter 230 is not limited to the three primary colors of red, green and blue, and may display, for example, cyan, magenta, yellow, and white-based colors.

A first insulating layer 240 may be further formed on the color filter 230. The first insulating layer 240 may include an organic insulating material, and may serve to planarize the color filters 230. The first insulating layer 240 may be formed in a structure in which a layer including an organic insulating material and a layer including an inorganic insulating material are stacked, and may be omitted if necessary.

A first contact hole 181h, through which the wide end portion of the first drain electrode 175h is exposed, and a second contact hole 181l, through which the wide end portion of the second drain electrode 175l is exposed, are formed in the passivation layer 180, the color filter 230, and the first insulating layer 240.

A pixel electrode 191 is formed on the first insulating layer 240. The pixel electrode 191 may include a transparent metal material, such as, for example, indium-tin oxide (ITO) and indium-zinc oxide (IZO).

The pixel electrode 191 includes a first sub pixel electrode 191h and a second sub pixel electrode 191l which are separated from each other by the gate line 121 and the storage electrode line 131 interposed therebetween, and disposed on and under the pixel PX based on the gate line 121 and the storage electrode line 131 to be adjacent to each other in the column direction. The first sub pixel electrode 191h and the second sub pixel electrode 191l are separated from each other with the first valley V1 interposed therebetween, and the first sub pixel electrode 191h is positioned in the first sub pixel PXa and the second sub pixel electrode 191l is positioned in the second sub pixel PXb.

The pixel electrode 191 is formed so as to overlap the data line 171. The pixel electrode 191 is formed to extend to a portion in which the data line 171 is formed, thereby improving an aperture ratio.

In the general display device, an area in which the pixel electrode 191 overlaps the data line 171 may be different due to misalignment of the mask. Accordingly, a deviation of capacitance between the pixel electrode 191 and the data line 171 may be generated. In an embodiment of the present invention, the pixel electrode 191 is formed to completely overlap the data line 171 to prevent the deviation from being generated.

The first sub pixel electrode 191h is connected to the first drain electrode 175h through the first contact hole 181h, and the second sub pixel electrode 191l is connected to the second drain electrode 175l through the second contact hole 181l. Accordingly, when the first thin film transistor Qh and the second thin film transistor Ql are in an on-state, the first sub pixel electrode 191h and the second sub pixel electrode 191l receive different data voltages from the first drain electrode 175h and the second drain electrode 175l, respectively. An electric field may be formed between the pixel electrode 191 and the common electrode 270.

A general shape of each of the first sub pixel electrode 191h and the second sub pixel electrode 191l is a quadrangle, and the first sub pixel electrode 191h and the second sub pixel electrode 191l include cross-shaped stem portions formed by horizontal stem portions 193h and 193l and vertical stem portions 192h and 192l crossing the horizontal stem portions 193h and 193l. Further, each of the first sub pixel electrode 191h and the second sub pixel electrode 191l includes a plurality of micro branch portions 194h and 194l.

The pixel electrode 191 is divided into four sub regions by the horizontal stem portions 193h and 193l and the vertical stem portions 192h and 192l. The micro branch portions 194h and 194l obliquely extend from the horizontal stem portions 193hl and 193l and the vertical stem portions 192h and 192l, and the extension direction may form an angle of approximately 45° or 135° with the gate line 121 or the horizontal stem portions 193h and 193l. Further, the directions in which the micro branch portions 194h and 194l in the adjacent two sub regions extend may be orthogonal to each other.

In one embodiment, the first sub pixel electrode 191h and the second sub pixel electrode 191l may further include outer stem portions surrounding outer sides of the first sub pixel PXa and the second sub pixel PXb, respectively.

The disposition form of the pixel, the structure of the thin film transistor, and the shape of the pixel electrode described above are one example, and the present invention is not limited thereto, and various modifications are feasible.

A light block 225 and a spacer 227 are formed on the pixel electrode 191 and the first insulating layer 240.

The light block 225 is positioned in the first valley V1. The thin film transistors Qh and Ql are positioned in the first valley V1, and the light block 225 is formed to overlap the thin film transistors Qh and Ql. Further, the light block 225 may be formed to additionally overlap the gate line 121 and the storage electrode line 131. Particularly, the light block 225 is formed to cover the first contact hole 181h and the second contact hole 181l formed for the connection between the thin film transistors Qh and Ql and the pixel electrode 191 to serve to prevent light leakage.

The spacer 227 is positioned in the second valley V2. The spacer 227 is formed to overlap the data line 171. The data line 171 overlaps the edge of the pixel electrode 191, and the spacer 227 also overlaps the edge of the pixel electrode 191. The spacer 227 serves to prevent light leakage, and serves to prevent a short circuit between the common electrode 270 and the pixel electrode 191 to be described below. Further, it is possible to decrease capacitance between the common electrode 270 and the data line 171 by increasing a distance between the common electrode 270 and the data line 171.

The light block 225 and the spacer 227 are formed on the same layer. The light block 225 and the spacer 227 may include the same material, and include a material capable of blocking light. The light block 225 and the spacer 227 may be formed by the same process. The light block 225 and the spacer 227 may be formed to have different heights, and may be formed by using a slit mask or a halftone mask in the same process.

A light block passivation layer 229 is formed on the light block 225 and the spacer 227. The light block passivation layer 229 is positioned in the first valley V1 and the second valley V2. The light block passivation layer 229 is formed so as to overlap the thin film transistors Qh and Ql, the gate line 121, and the data line 171. The light block passivation layer 229 may include an inorganic insulating material, such as, for example, silicon nitride (SiNx) and silicon oxide (SiOx), and serves to protect the light block 225 and the spacer 227. Further, the light block passivation layer 229 serves to prevent a short circuit between the common electrode 270 and the pixel electrode 191 similar to the spacer 227.

The common electrode 270 is formed on the pixel electrode 191 so as to be spaced apart from the pixel electrode 191 by a predetermined distance. The microcavity 305 is formed between the pixel electrode 191 and the common electrode 270. The microcavity 305 is surrounded by the pixel electrode 191 and the common electrode 270. A width and an area of the microcavity 305 may be variously modified according to a size and resolution of the display device.

The common electrode 270 may include a transparent metal material such as, for example, indium-tin oxide (ITO) and indium-zinc oxide (IZO). A predetermined voltage may be applied to the common electrode 270, and an electric field may be formed between the pixel electrode 191 and the common electrode 270.

The common electrode 270 is formed in the second valley V2 as well as in the pixel PX. The common electrode 270 in the second valley V2 is formed on the light block passivation layer 229.

The common electrode 270 may be short-circuited with the pixel electrode 191 in a structure in which the pixel electrode 191 is extended so as to overlap the data line. Particularly, the common electrode 270 may be short-circuited with the pixel electrode 191 in the second valley V2 in which the microcavity 305 is not formed. In an embodiment of the present invention, the spacer 227 and the light block passivation layer 229 are formed between the pixel electrode 191 and the common electrode 270. The spacer 227 and the light block passivation layer 229 are formed so as to overlap the data line 171 in the second valley V2, so that it is possible to prevent the short circuit between the pixel electrode 191 and the common electrode 270.

In this case, the spacer 227 may be formed with substantially the same height as that of the microcavity 305. In the drawings, it is illustrated that the spacer 227 is slightly lower than the microcavity 305, but the spacer 227 may be formed to have the same height as that of or to be slightly higher than the microcavity 305. The height of the spacer 227 corresponds to the height of the microcavity 305 as described above, so that a height of the common electrode 270 formed on the microcavity 305 and the spacer 227 is uniform. Accordingly, it is possible to prevent a disconnection of the common electrode 270.

A first alignment layer 11 is formed on the pixel electrode 191. The first alignment layer 11 may also be formed right on the first insulating layer 240 which is not covered by the pixel electrode 191.

A second alignment layer 12 is formed under the common electrode 270 so as to face the first alignment layer 11.

The first alignment layer 11 and the second alignment layer 12 may be formed by a vertical alignment layer, and may include an alignment material, such as, for example, polyamic acid, polysiloxane, polyimide, or the like. The first and second alignment layers 11 and 12 may be connected on a side wall of the edge of the microcavity 305.

A liquid crystal layer including liquid crystal molecules 310 is formed in the microcavity 305 positioned between the pixel electrode 191 and the common electrode 270. The liquid crystal molecules 310 have negative dielectric anisotropy, and may be erected in a vertical direction on the substrate 110 in a state where an electric field is not applied. That is, vertical alignment may be implemented.

The first sub pixel electrode 191h and the second sub pixel electrode 191l, to which the data voltage is applied, generate an electric field together with the common electrode 270 to determine a direction of the liquid crystal molecules 310 positioned in the microcavity 305 between the two electrodes 191 and 270. Luminance of light passing through the liquid crystal layer is changed according to the thusly determined direction of the liquid crystal molecules 310.

A second insulating layer 350 may be further formed on the common electrode 270. The second insulating layer 350 may include an inorganic insulating material, such as, for example, silicon nitride (SiNx) and silicon oxide (SiOx), and may be omitted if necessary.

The roof layer 360 is formed on the second insulating layer 350. The roof layer 360 may include an organic material. The microcavity 305 is formed under the roof layer 360, and the roof layer 360 may be hardened by a hardening process to maintain the shape of the microcavity 305. The roof layer 360 is formed to be spaced apart from the pixel electrode 191 with the microcavity 305 interposed therebetween.

The roof layer 360 is formed in each pixel PX and the second valley V2 along the pixel row, and is not formed in the first valley V1. The roof layer 360 is not formed between the first sub pixel PXa and the second sub pixel PXb. In each of the first sub pixel PXa and the second sub pixel PXb, the microcavity 305 is formed under each roof layer 360. The microcavity 305 is not formed under the roof layer 360 in the second valley V2, but the spacer 227 is formed in the second valley V2 instead of the microcavity 305.

The injection holes 307a and 307b, through which parts of the microcavities 305 are exposed, are formed in the roof layer 360. The injection holes 307a and 307b include a first injection hole 307a, through which a lateral surface of a first edge of the microcavity 305 is exposed, and a second injection hole 307b, through which a lateral surface of a second edge of the microcavity 305 is exposed. The first injection hole 307a of one microcavity 305 among the adjacent two microcavities 305 and the second injection hole 307b of the other microcavity 305 face each other with the first valley V1 interposed therebetween. The microcavities 305 are exposed by the injection holes 307a and 307b, so that an alignment solution, a liquid crystal material, or the like may be injected into the microcavities 305 through the injection holes 307a and 307b.

The aforementioned light block 225 and light block passivation layer 229 may be formed so as to partially overlap the injection holes 307a and 307b.

A third insulating layer 370 may be further formed on the roof layer 360. The third insulating layer 370 may include an inorganic insulating material, such as, for example, silicon nitride (SiNx) or silicon oxide (SiOx). The third insulating layer 370 may be formed to cover an upper surface and a lateral surface of the roof layer 360. The third insulating layer 370 serves to protect the roof layer 360 including the organic material, and may be omitted if necessary.

An encapsulation layer 390 may be formed on the third insulating layer 370. The encapsulation layer 390 is formed so as to cover the injection holes 307a and 307b through which parts of the microcavities 305 are exposed to the outside. The encapsulation layer 390 may seal the microcavity 305 so that the liquid crystal molecules 310 formed in the microcavity 305 are not discharged to the outside. Since the encapsulation layer 390 is in contact with the liquid crystal molecules 310, the encapsulation layer 390 may include a material that does not react with the liquid crystal molecules 310. For example, the encapsulation layer 390 may include parylene or the like.

The encapsulation layer 390 may include multiple layers such as for example a double layer or a triple layer. The double layer includes two layers formed of different materials. The triple layer includes three layers, and materials of the adjacent layers are different from each other. For example, the encapsulation layer 390 may include a layer including an organic insulating material and a layer including an inorganic insulating material.

Although not illustrated in the drawings, a polarizer may be further formed on upper and lower surfaces of the display device. The polarizer may include a first polarizer and a second polarizer. The first polarizer may be attached to a lower surface of the substrate 110, and the second polarizer may be attached onto the encapsulation layer 390.

Next, a display device according to an embodiment of the present invention will be described below with reference to FIGS. 6 and 7.

Figure 6:
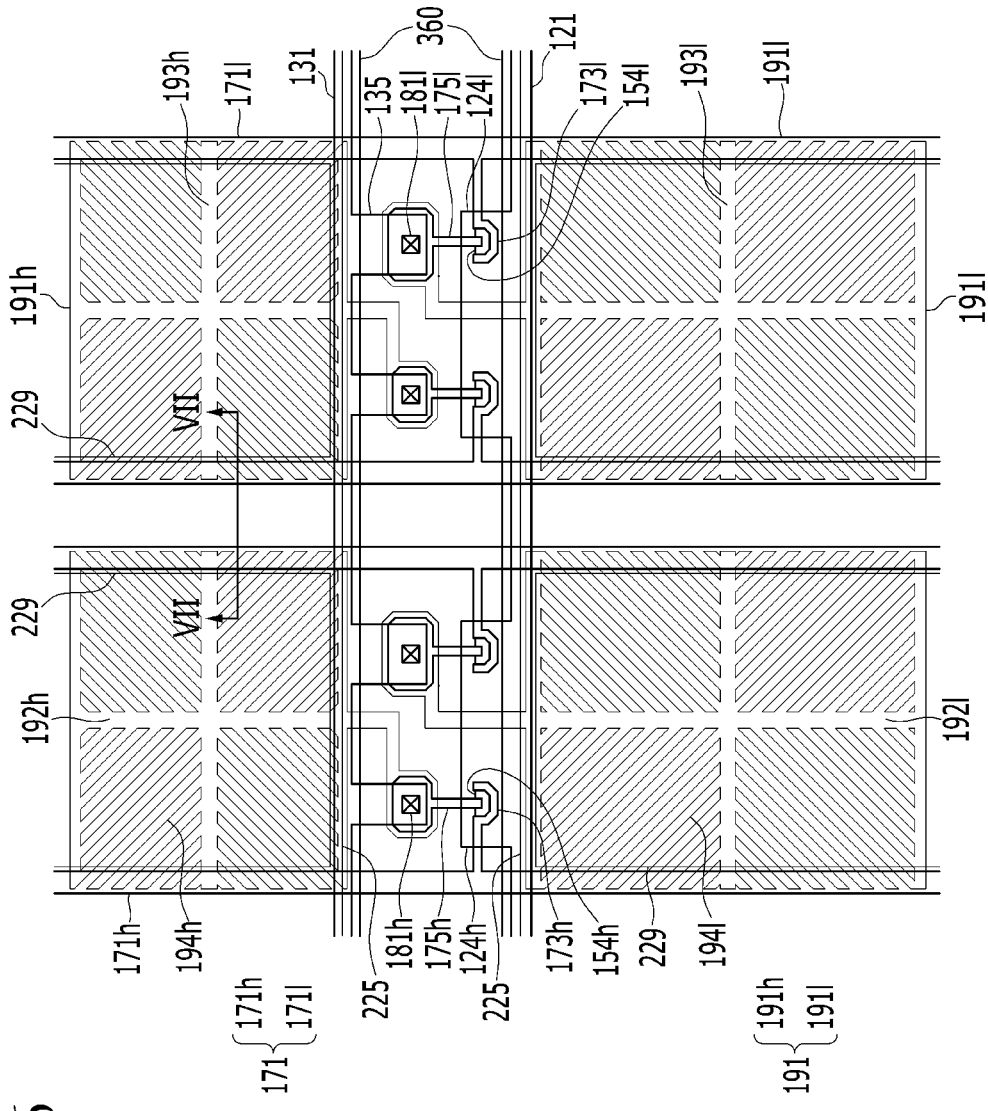
FIG. 6 is a layout view illustrating a part of the display device according an embodiment.
Figure 7:
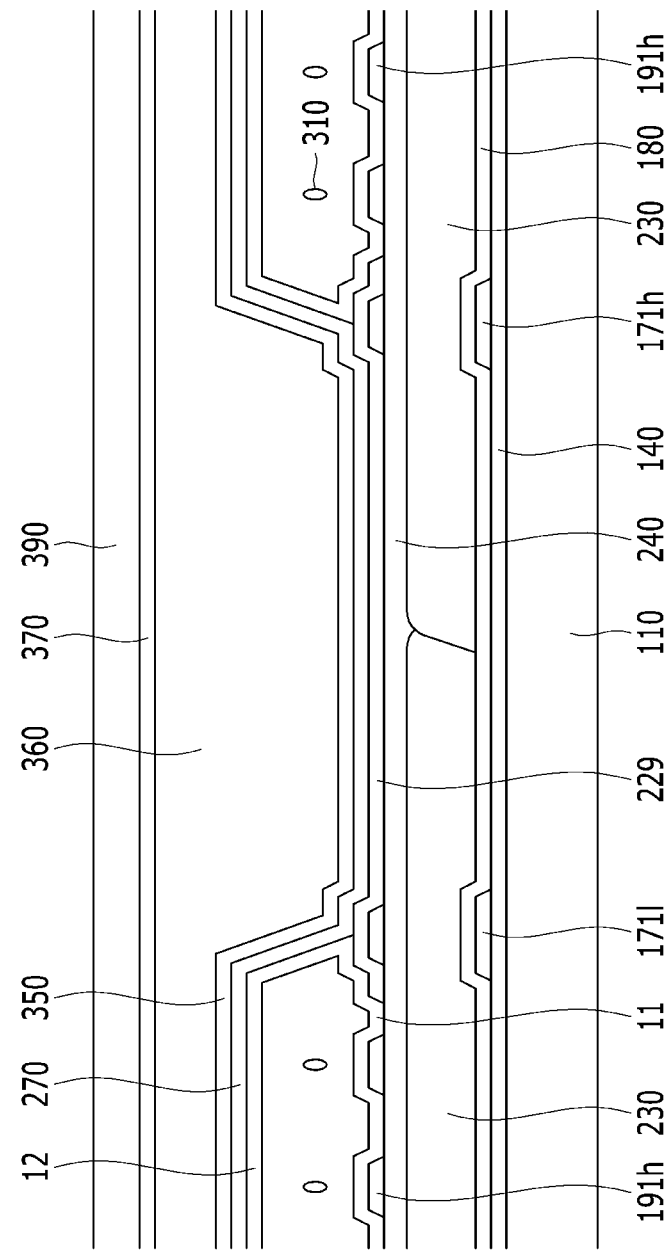
FIG. 7 is a cross-sectional view illustrating the display device according to an embodiment taken long line VII-VII.

Constituent elements of the display device illustrated in FIGS. 6 and 7 are considerably the same as those of the display device illustrated in FIGS. 1 to 5, so descriptions thereof will be omitted. The embodiment of FIGS. 6 and 7 is different from the aforementioned embodiment in that a spacer is omitted, and will be described below in more detail.

FIG. 6 is a layout view illustrating a part of the display device according to an embodiment, and FIG. 7 is a cross-sectional view illustrating the display device taken long line VII-VII.

In the display device, a pixel electrode 191 is formed on a substrate 110, and a common electrode 270 is formed with the pixel electrode 191 and a microcavity 305 interposed therebetween. The pixel electrode 191 is formed so as to overlap a data line 171.

Similar to the aforementioned embodiment, a light block 225 is formed in a first valley V1, but contrary to the aforementioned embodiment, the spacer 227 is not formed in a second valley V2.

A light block passivation layer 229 is formed on the light block 225. The light block passivation layer 229 is positioned in the first valley V1 and the second valley V2. The light block passivation layer 229 is formed so as to overlap thin film transistors Qh and Ql, a gate line 121, and a data line 171. The light block passivation layer 229 may include an inorganic insulating material, such as, for example, silicon nitride (SiNx) or silicon oxide (SiOx), and serves to prevent the light block 225. Further, the light block passivation layer 229 serves to prevent a short circuit between the common electrode 270 and the pixel electrode 191.

A position at which the light block passivation layer 229 is formed is the same as that in the aforementioned embodiment, but the spacer 227 is not formed under the light block passivation layer 229. Even though the spacer 227 is not formed, the light block passivation layer 229 includes an insulating material, so that it is possible to prevent a short circuit between the pixel electrode 191 and the common electrode 270.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a substrate;
a gate line and a data line disposed on the substrate;
a thin film transistor connected to the gate line and the data line;
a pixel electrode connected to the thin film transistor, wherein a first edge of the pixel electrode overlaps the data line;
a light block overlapping the thin film transistor and a second edge of the pixel electrode;
a light block passivation layer overlapping the thin film transistor the data line and the first edge and the second edge of the pixel electrode on the light block;
a common electrode disposed on the pixel electrode, spaced apart from the pixel electrode with a plurality of microcavities interposed therebetween;
a roof layer disposed on the common electrode;
a liquid crystal layer disposed in the plurality of microcavities; and
an encapsulation layer disposed on the roof layer to seal the plurality of microcavities,
wherein the light block passivation layer does not overlap the center of the pixel electrode.

2. The display device of claim 1, wherein:
the data line includes a first data line and a second data line,
the pixel electrode includes a first sub pixel electrode and a second sub pixel electrode, and
the first sub pixel electrode and the second sub pixel electrode overlap the first data line and the second data line.

3. The display device of claim 2, wherein:
different data voltages are applied to the first data line and the second data line.

4. The display device of claim 3, wherein:
a data voltage applied to the first data line is higher than a data voltage applied to the second data line.

5. The display device of claim 1, wherein:
the data line is positioned between two adjacent microcavities.

6. The display device of claim 5, wherein:
the data line is positioned between two adjacent microcavities in a row direction.

7. The display device of claim 6, wherein:
the gate line is positioned between two adjacent microcavities in a column direction.

8. The display device of claim 7, wherein:
the light block and the light block passivation layer overlap the gate line.

9. The display device of claim 8, wherein:
the gate line and the data line cross each other.

10. The display device of claim 9, further comprising:
a storage electrode line extends in parallel with the gate line, and overlapping the second edge of the pixel electrode.

11. The display device of claim 10, wherein:
the storage electrode line does not overlap the first edge of the pixel electrode.

12. The display device of claim 5, further comprising:
a spacer overlapping the data line.

13. The display device of claim 12, wherein:
the spacer is disposed on the pixel electrode, and is disposed under the light block passivation layer.

14. The display device of claim 13, wherein:
the spacer is disposed on the same layer as that of the light block.

15. The display device of claim 14, wherein:
the spacer comprises a same material as that of the light block.

16. The display device of claim 5, wherein:
the light block passivation layer is disposed on the pixel electrode, and is disposed under the common electrode.

17. The display device of claim 16, wherein:
the light block passivation layer comprises an inorganic insulating material including silicon nitride and silicon oxide.

* * * * *